Figure 1:
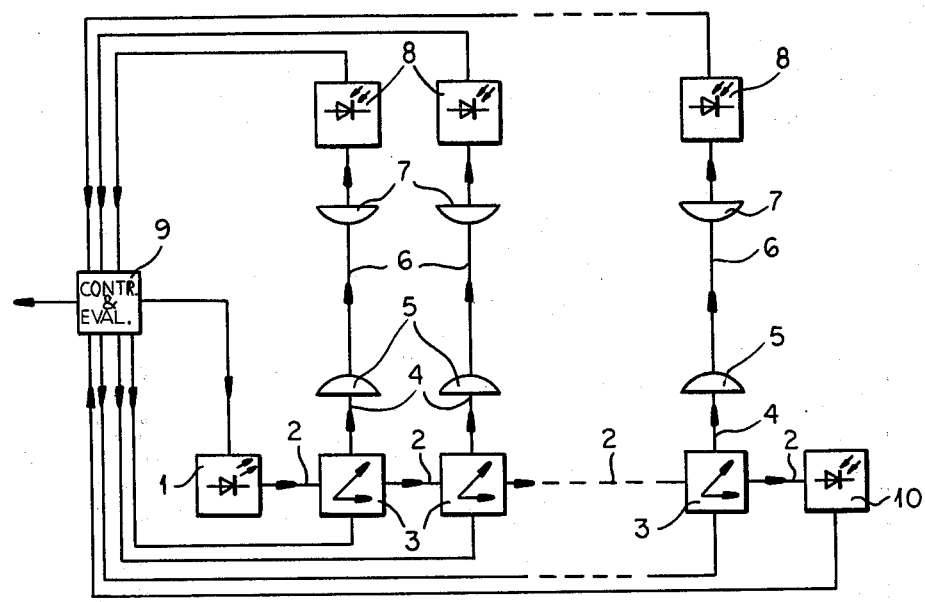

United States Patent [19]

Spratte

[11] 4,405,858

[45] Sep. 20, 1983

[54] LIGHT GATE WITH CONTROLLED OPTICAL COUPLERS

[75] Inventor: Hans-Hermann Spratte, Mülheim, Fed. Rep. of Germany

[73] Assignee: Krohne Messtechnik GmbH & Co. KG, Duisburg, Fed. Rep. of Germany

[21] Appl. No.: 276,373

[22] PCT Filed: Oct. 10, 1980

[86] PCT No.: PCT/EP80/00108
§ 371 Date: Jun. 12, 1981
§ 102(e) Date: Jun. 12, 1981

[87] PCT Pub. No.: WO81/01200
PCT Pub. Date: Apr. 30, 1981

[30] Foreign Application Priority Data

Oct. 16, 1979 [DE] Fed. Rep. of Germany ....... 2941739

[51] Int. Cl.³ .............................................. G01V 9/04
[52] U.S. Cl. ................................... 250/221; 250/227; 350/96.16
[58] Field of Search ................... 250/221, 222.1, 227; 350/96.16; 455/610, 612; 340/555, 556, 557

[56] References Cited

U.S. PATENT DOCUMENTS 3,781,092 12/1973 Sussman et al. ..................... 250/227
4,015,122 3/1977 Rubinstein ........................... 250/221
4,310,756 1/1982 Sick et al. ............................ 250/221

*Primary Examiner*—David C. Nelms
*Attorney, Agent, or Firm*—Karl F. Ross

[57] ABSTRACT

The light gate serving for the generation of a signal upon an undesired intrusion into the working space of a machine has a light source (1) whose light beams are successively directed via a controlled light-distribution unit to several optical channels (6) to which a light-receiving device is assigned. The light-distribution unit is provided with a number of directive optical couplers (3), corresponding to the number of optical channels (6) whose respective secondary waveguide adjoins a light conductor (4) of the associated optical channel (6) and which are connected via a further light conductor (2) in series with the light source (1) and with one another. The electrodes of the directive couplers (3) are connected to an electronic control and evaluation device (9). The directive optical couplers form electronically controllable light-switching points with whose aid the light pulses of the light source (1) can be successively and cyclically directed into the optical channels (6).

4 Claims, 4 Drawing Figures

LIGHT GATE WITH CONTROLLED OPTICAL COUPLERS

The invention relates to a light gate with a single light source whose light beam can be successively directed by means of a light-distributing unit, energized by a control device, to several optical channels each comprising a light conductor on the transmission side, as well as with a light-receiving device which is coupled with these channels and is followed by an electronic evaluator.

Light gates have the purpose of generating, upon an undesired intrusion into the working space in a machine such as for example a press, a signal by means of which the machine is temporarily or completely arrested. They consist of a multiplicity of optical channels which encompass the working space to be monitored and which are each formed by a light transmitter and a light receiver. An electronic evaluator generates the signal upon an interruption of the light path. For light gates of this type two systems are basically known. In one system each optical channel has a light source of its own, e.g. in the form of a light-emitting diode; the light sources are simultaneously activated in cyclic succession and the signals of the light receivers are combined in an AND-circuit (German published application No. 16 16 016) or the light sources are successively cyclically activated with control of the evaluation of the output signals in the same rhythm (German Pat. No. 22 47 053), or the light signals are led by way of a common light conductor to a single photoelectric transducer (German printed specification No. 19 41 905). In the other system the optical channels are illuminated by a common light source, the distribution of the light to the channels being carried out by a lens system or with the aid of a rotary mirror and a parabolic mirror (German published application No. 14 41 426). In an arrangement operating according to this system (German published application No. 21 58 182), a control device in the form of a motor actuates a light-distributing unit which is constituted by a movable optic coacting in turn with a single light source. The swinging or rotating optic irradiates in succession, via light conductors, several optical transmitting channels with a beam emanating from the light source, and the photoelectric transducers are followed by an electronic evaluator.

The light-receiving devices can be disposed either on the side of the working space to be monitored which is opposite the light sources or on the same side as the light sources; in the latter case a reflector is disposed on the opposite side and the reflected rays are directed by semitransparent mirrors onto the corresponding light receivers.

All known incandescent or fluorescent lamps have the drawback that these light sources are of complicated structure and are highly trouble-prone (short lifespan). A pulsed mode of operation desirable for the suppression of interfering light considerably reduces the lifespan with the aforementioned light sources. The known lens systems permit only the simultaneous operation of all channels and ray distribution by means of a rotary mirror allows neither the duration of the light pulses not their sequence to be controlled. The photodiodes serving as light receivers also constitute a source of interference. With superirradiation of adjoining optical channels or with extraneous light sources they can generate error signals which must be eliminated by a complex self-supervising logical test circuit (coincidence stage).

In contradistinction thereto, the invention has the object of so designing a light gate of the generic type that the light pulses fed to the several optical channels and originating at one light source can be controlled in duration and sequence without the use of movable structural elements.

This object is realized in accordance with the invention by the features (a) to (d) of claim 1.

In the light gate designed in accordance with the invention, the directive optical couplers form electrically controllable light-switching points with whose aid the light pulses generated in a light source and transmitted through a conductor are successively cyclically directed to the optical channels. Whereas with a light distribution by means of a rotary mirror the duration and sequence of the light pulses directed into the optical channels depends on the optical structure and the rotary speed, the invention enables a variation of the duration and sequence of the light pulses and thus an adaptation thereof to different situations. No trouble-prone mechanical elements are required in this instance.

The directive optical couplers known for optical communication systems consist of two dielectric waveguides embedded in a substrate and of electrodes serving to create an electrical field ("Integriert optische Richtkoppler", P. Baues, ELEKTRONIK-ANZEIGER, 1977, No. 3, pages 19–22). The waveguides are so determined and arranged that the light wave conducted in the primary waveguide remains upon the application of an electrical field and enters the secondary waveguide in the absence of an electrical field. Depending on the structure, directive optical couplers can be used for modulation or as light switches. The light conductors of glass or synthetic material provided in accordance with the invention, known for the transmission of light signals, consist of cores with high refractive index which are surrounded by a jacket of a material of somewhat lower refractive index.

According to the invention, a light bus is formed by a light conductor and directive optical couplers each serially connected thereto with one of its waveguides. The light pulses generated by the light source are led through this light bus and are directed by the application of a control voltage to one of the directive couplers into the associated optical channel. The sequence of the directive couplers to be activated and the cyclical recurrence thereof is determined by a suitable control program. In the same way it is also possible to determine the duration of the deviation of each single directive coupler by the duration of the applied control voltage.

The novel light-distributing system is especially suitable for operation with visible radiation propagating in the fundamental mode, with use of a laser diode or the like as a radiation source. Similarly, however, rays of larger or smaller wavelengths or polarized light may be used.

The directive optical couplers undergo neither wear nor aging since only the refractive index of their material is altered with the aid of the control voltage.

According to a further feature of the invention it is possible to use the novel light-transmission system also on the receiving side of the light gate, with each optical channel consisting on the receiving side of a light conductor and each of these light conductors being connectable via an additional light conductor to one and the same light-receiving diode. This construction has the advantage that the light pulses consecutively received from the individual light conductors are optically directed to but one light-receiving diode whereas up to now a multiplicity of light-receiving diodes were required. Thus, the light gate comprises for the emission and reception of the light energy only two diodes, namely a luminescent diode and a photodiode. This, advantageously, considerably simplifies the control of the diodes and the self-supervision of the light gate.

The connection of the individual light conductors to the light conductor leading to the light-receiving diode can be effected, for example, by connecting the receiving-side light conductors via a Y-distributor to the additional light conductor leading to the light-receiving diode (ntz vol. 31, 1978, 423–425). It is, however, also possible to make the receiving-side light conductors connectable to the light conductor leading to the light-receiving diode by means of respective directive optical couplers whose electrodes are controllable by the control and evaluation device synchronously with the directive optical couplers assigned to the light source. The light-conductor systems for the illumination and for the light reception are thus identical so that manufacture is simplified. Moreover, the directive optical couplers on both sides can be activated in many combinations and thereby enhance the possibilites for the control and surveillance of the light gate. Closure of the channels not activated also largely eliminates the interfering influence of overlap and extraneous lights.

The light-receiving devices can either be disposed on the side of the working space to be monitored opposite the light sources or, with use of a reflector, be juxtaposed with the optical devices mounted on the transmitting side.

Figure 2:
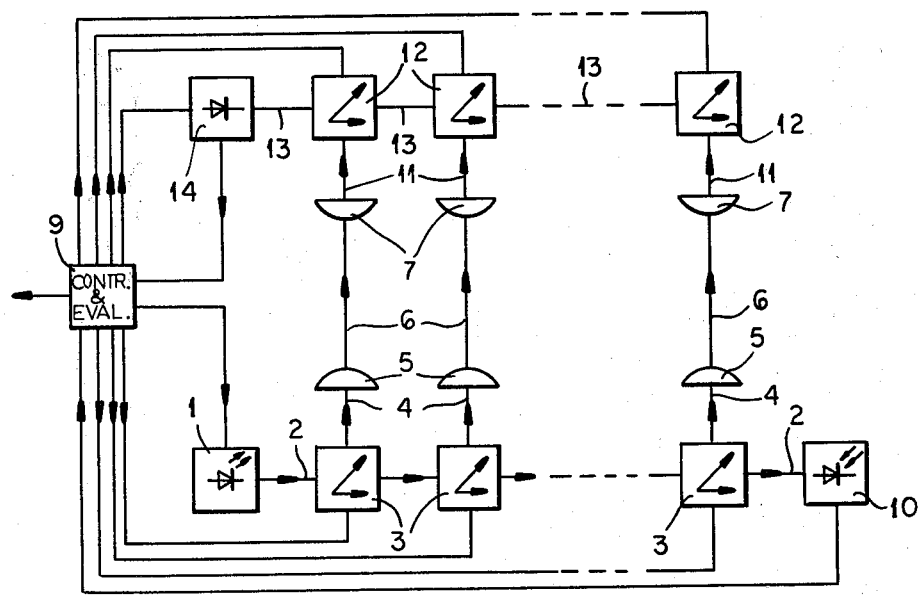
Figure 3:
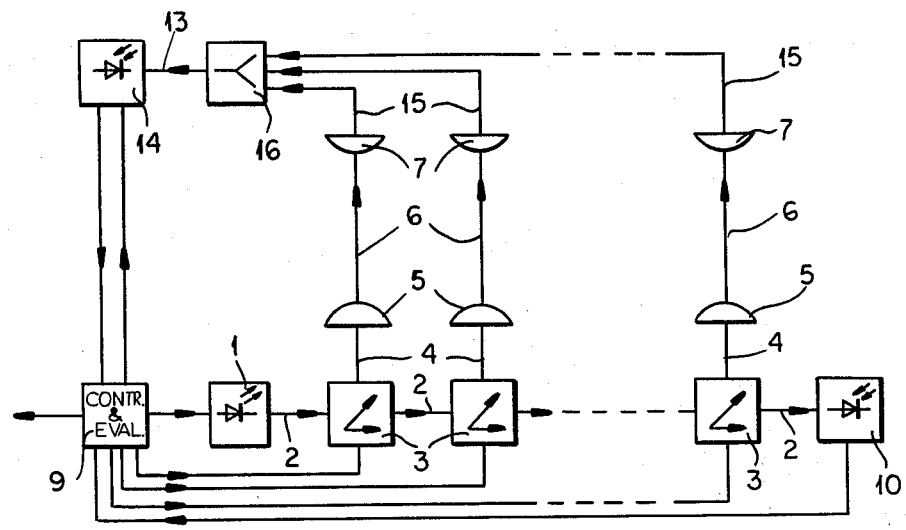
Figure 4:
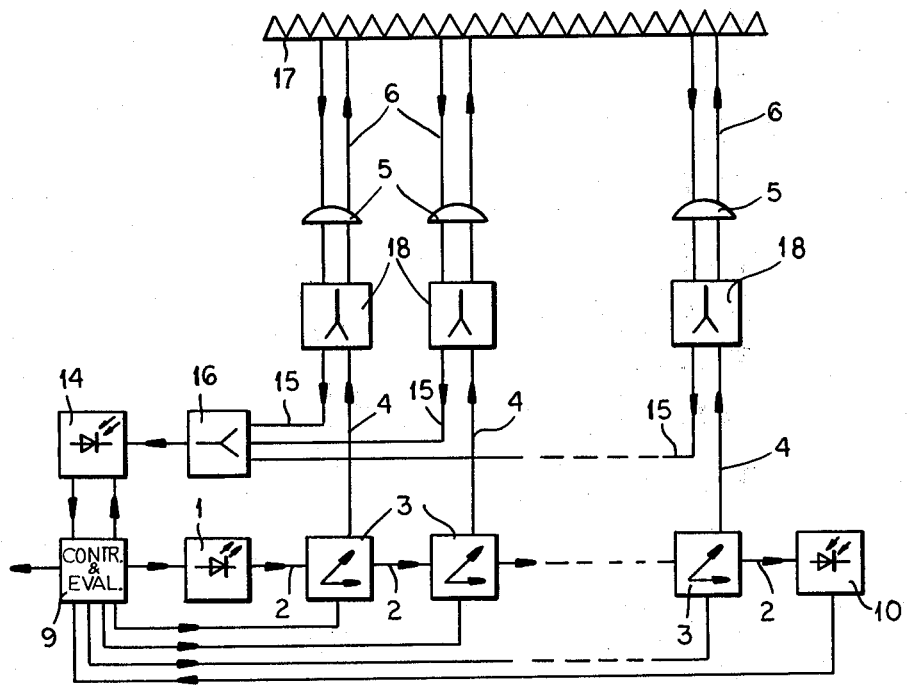

The subject matter of the invention has been illustrated in the drawing with the aid of block diagrams in several embodiments; therein:

FIG. 1 shows a light gate with directive optical couplers on the transmitting side, FIG. 2 shows a light gate with directive optical couplers on the transmitting and receiving sides, FIG. 3 shows a light gate with directive optical couplers on the transmitting side and light conductors on the receiving side, and FIG. 4 shows a light gate with reflector and directive optical couplers as well as light conductors forming the receiving part on the transmitting side.

The light gate illustrated in FIG. 1 comprises a light source 1, e.g. in the form of a laser diode, to which a light conductor 2 is connected. The light conductor 2 of glass or synthetic material consists of a core with high refractive index surrounded by a jacket of a material with a somewhat lower refractive index. In series with this light conductor 2 there are disposed in a row a multiplicity of directive optical couplers 3. These are elements known per se as described for example in the publication "Integriert optische Richtkoppler", P. Baues, ELEKTRONIK-ANZEIGER, 1977 No. 3, pages 19-22. They consist of two electrical waveguides embedded in a substrate and of electrodes serving for the generation of an electronic field. The waveguides are so dimensioned and arranged that the light wave conducted in the primary waveguide remains upon application of an electric field and penetrates into the secondary waveguide in the absence of an electric field. There are several constructions comprising either two or three electrodes. These directive optical couplers 3 are each so connected to the light conductor 2 that the light pulses coming from the light source 1 are led in the decoupled state through the primary waveguides of these directive couplers 3. The primary waveguides of the directive couplers 3 are thus connected in series; the light conductor 2 therefore practically consists of several sections respectively connected to the input and output of the directive couplers.

To the output of each secondary waveguide there is connected a light conductor 4 leading to an optical device which consists for example of respective lenses 5 as illustrated. At the output of each of these lenses 5 there is formed an optical channel 6. The light rays pass through these optical channels 6 to a lens 7 directing them onto a respective light-receiving diode 8, e.g. a photodiode. These light-receiving diodes 8 are connected to an electronic control and evaluation device 9. Moreover, there is connected to the end of the light conductor 2 a photodiode 10 serving for supervisory purposes.

The electronic control and evaluation device can be so designed as to emit control pulses for the generation of high-frequency light pulses to the light source 1. At the same time this electronic control and evaluation device 9 controls the directive optical couplers 3 in such a manner that their electrodes are successively and cyclically energized. In this way the light pulses coming from the light source 1 are directed by a respective activated directive coupler 3 to the associated light conductor 4 whence they further travel through the corresponding optical channel 6 to the assigned light-receiving diode 8 whose signals are transmitted to the electronic control and evaluation device. Thus, the electronic control and evalutation device times on the one hand the light pulses and controls on the other hand the directive couplers in the predetermined sequence and cyclically. This device furthermore evaluates the signals coming from the light-receiving diodes 8, e.g. in a counting and comparison network. If the magnitude received a certain unit of time does not conform to the associated reference value, the electronic control and evaluation device emits an alarm signal which can then be used for arresting the working machine or the like.

At the output of the light conductor 2 there is further disposed a photodiode 10 serving for supervisory purposes. This can be used especially for checking the operativeness of the light source 1 and of the directive couplers 3. If the directive couplers 3 are all in a decoupled state, it is possible to check whether the light source 1 performs its task. A checking of the directive couplers is carried out by changing a respective one of them to the coupled state; in the event of inoperativeness, the light ray then passes via the light conductor 2 into the photodiode 10 which delivers a corresponding alarm signal to the electronic control and evaluation device.

In the embodiment of FIG. 2 the transmitting side has the same structure as in the embodiment of FIG. 1. Here, however, there is connected on the receiving side behind each lens 7 a respective light conductor 11 which terminates in one waveguide of an associated directive optical coupler 12. The secondary side of this directive coupler is connected to a light conductor 13 leading to a common light-receiving diode 14.

With this embodiment the directive optical couplers on the receiving side are likewise controlled by the electronic control and evaluation device, in the same rhythm as the associated directive optical couplers 3 of the corresponding optical channel 6. In like manner, the light-receiving diode 14 is controlled in a corresponding rhythm.

Both the light conductor 2 and the light conductor 13 form a kind of "light bus" to which the optical channels are connected. With this embodiment the control of the individual directive optical couplers can be varied in any desired manner. It is also possible to illuminate two or more optical channels 6, which may be disposed next to one another, or to perform for example an illumination from the outside in so as to carry out, for example, thickness measurements or the like.

A further embodiment is shown in FIG. 3. Here, on the receiving side, the lenses of the individual optical channels 6 are connected to light conductors 15 which are combined by a so-called Y-distributor 16 and are connected to a light-receiving diode 14. Y-distributors of this type are so-called branch points of light-guiding fibers as described for example in ntz vol. 31, 1978, pages 423–425. They can be used both for the distribution and for the collection of light rays.

The embodiment of FIG. 4 is similar to that of FIG. 3. Here, however, a return of the light rays of each optical channel 6 by means of a reflector 16 is provided. The light rays redirected by these reflectors 17 return to the lenses 5 respectively assigned thereto and are conducted from there via a junction 18, here also designed as a branch point of a light-guiding fiber, and via a respective further light conductor 15 to a Y-distributor 16 combining the several light conductors 15. Here, too, the combined light conductor is extended to a light-receiving diode 14.

The directive couplers can also be disposed in the manner of a microcircuit on a substrate, one behind the other, with the primary waveguides each connected to a light bus. A cascaded structure, however, is also possible. In this case a module has assigned to it only one primary waveguide beyond which the secondary waveguides of the several directive couplers are disposed in cascade. Corresponding electrodes are associated with these cascaded waveguides. If they are simultaneously energized, the light ray from the primary waveguide can be successively transmitted through several secondary waveguides.

What is claimed is:

1. Light gate with a single light source whose light beam can be successively directed by means of a light-distributing unit, energized by a control device, to several optical channels each comprising a light conductor on the transmission side, as well as with a light-receiving device which is coupled with these channels and is followed by an electronic evaluator, characterized by the following features:
    (a) the light-distributing unit comprises a number of directive optical couplers (3) identical with the number of optical channels (6),
    (b) each of the secondary waveguides of the directive optical couplers (3) adjoins a respective light conductor (4) of an optical channel (6),
    (c) the directive optical couplers (3) are disposed via a further light conductor (2) in series with the light source (1) and with one another,
    (d) the electrodes of the directive optical couplers (3) are connected to a control and evaluation device (9) consisting of the control device and the electronic evaluator.

2. Light gate according to claim 1, characterized in that each optical channel consists on the receiving side of a light conductor (11 or 15) and that each of these light conductors (11 or 15) is connectable via an additional light conductor (13) to one and the same light-receiving diode (14).

3. Light gate according to claim 2, characterized in that the receiving-side light conductors (15) are connected via a Y-distributor (16) to the additional light conductor (13) leading to the light-receiving diode (14).

4. Light gate according to claim 2, characterized in that the receiving-side light conductors (11) are connectable to the light conductor (13) leading to the light-receiving diode (14) via respective directive optical couplers (12) whose electrodes are controllable synchronously with the directive optical couplers (3), associated with the light source (1), by the control and evaluation device (9).

* * * * *